United States Patent [19]

Griffith et al.

[11] Patent Number: 5,216,558
[45] Date of Patent: Jun. 1, 1993

[54] DRAWER LOADING REMOVABLE CARTRIDGE DISK DRIVE

[75] Inventors: David Griffith; David Jones; Allen T. Bracken; Theon Rawlings, all of Layton, Utah

[73] Assignee: Iomega Corporation, Roy, Utah

[21] Appl. No.: 647,845

[22] Filed: Jan. 30, 1991

[51] Int. Cl.$^5$ ............................................. G11B 17/04
[52] U.S. Cl. .................. 360/99.06; 360/99.02; 360/99.12
[58] Field of Search ............ 360/99.06, 99.07, 99.02, 360/99.03, 99.12, 96.5, 97.01

[56] References Cited

U.S. PATENT DOCUMENTS

| | | | |
|---|---|---|---|
| 4,656,542 | 4/1987 | Shibata | 360/99.02 |
| 4,758,909 | 7/1988 | Harase | 360/106 |
| 5,067,121 | 11/1991 | Einhaus | 360/99.07 X |
| 5,111,350 | 5/1992 | Carey et al. | 360/99.06 |

*Primary Examiner*—John H. Wolff
*Attorney, Agent, or Firm*—Woodcock Washburn Kurtz Mackiewicz & Norris

[57] ABSTRACT

In a disk drive the drive motor and actuator are mounted in a drawer which is slidable to an open position in which there is no vertical obstruction over the motor. The removable cartridge can be placed on the motor with the motor extending into the cartridge to engage the hub. A shutter in an edge of the cartridge is moved to an open position when the drawer is closed to provide access for the actuator to move magnetic heads into read/write relationship with the disks. A lock for the shutter maintains it in the closed position when the drawer is open.

12 Claims, 5 Drawing Sheets

DRAWER LOADING REMOVABLE CARTRIDGE DISK DRIVE

BACKGROUND OF THE INVENTION

This invention relates to magnetic disk drives, and more particularly, to a disk drive having a removable cartridge.

Magnetic disk drives which write and read digital data from flexible magnetic disks have been extensively used. These are frequently referred to as "floppy" disks and "floppy disk drives." These drives have been extensively used for small, so-called microcomputer systems, for word-processing applications and the like. The flexible disk cartridge includes a relatively thin, flexible jacket which is inserted into the floppy disk drive. The disk drive clamps the flexible disk onto a motor shaft which rotates the disk which is contacted by a read/write head. This cartridge exposes certain areas of the disk recording surface to dust contamination, liquid spillage, fingerprints, and scratching. Also, the flexible jacket allows the possibility of mechanical damage to the entire disk.

Floppy disk drives have the great advantage of ease of insertion and changing the magnetic disk cartridge so that the operator can select the disk cartridge upon which the drive is to operate. However, present day floppy disk drives are not capable of operating with the precision, high speed data capacity and reliability which is present in the rigid disk drives.

Rigid disk drives, such as the IBM 3350, usually have a fixed rigid magnetic media. The magnetic heads do not contact the magnetic surface, but ride on a thin film of air. Because of this, and other features, these disk drives are capable of extremely precise and high speed operation. This type of disk drive is commonly referred to as a "Winchester" drive.

Recently, "Bernoulli" disk drives having performance characteristics similar to that of Winchester drives, but with removable cartridges, have been developed. A flexible magnetic disk is enclosed in a rigid box which is normally completely closed. As the cartridge is inserted into the drive, a slider on the cartridge is moved to an open position so that the flexible disk can be engaged by the hub of a motor which rotates the disk in a read/write relationship with a magnetic head. Access for a rotary actuator is through this same opening from which the slider is moved. The disk is rotated in proximity to a Bernoulli plate which stabilizes the disk.

U.S. Pat. No. 4,400,748-Bauck, et al and related patents to the common assignee show such drives using Bernoulli stabilized flexible disks. U.S. Pat. No. 4,901,173-Jones, et al and related patents to a common assignee, show improvements which relate to so-called "half height" drives. The disclosure of these patents is incorporated herein by reference.

Packaging and volume constraints of removable cartridge disk drives place them at a disadvantage as compared to fixed "Winchester" disk drives with in-hub motors. This is because these types of Winchester drives share the vertical space required for the motor with the vertical space required for the disks. Because no vertical space is needed for disengagement of the motor and disks, a large part of the entire height of the drive can be filled with disks, since the in-hub motor co-exists in this vertical space. The net result is more data capacity.

In a removable cartridge disk drive, the motor and disks typically do not share the same vertical space. To share this space the disks and cartridge would have to pass through the motor when inserting the cartridge, or the motor or cartridge would have to be translated vertically to engage and disengage the motor and disks. The disadvantage of this vertical translation is that it sweeps out vertical height that in the operating state cannot be utilized for disks like the above-mentioned fixed Winchester disk drive.

SUMMARY OF THE INVENTION

In accordance with the present invention, the drive motor for the disk drive is mounted in a drawer on the drive. When the drawer is moved to an open position, there is no vertical obstruction above the hub and motor so that the cartridge can be placed on the motor extending to the hub through the cartridge.

The drawer loading removable cartridge disk drive of the present invention allows the disk and motor to share vertical space without wasting volume within the drive envelope for translation of the disks or motor. The motor is mounted on a drawer that slides partially out to allow the vertical translation necessary for engagement to occur outside the drive envelope, where there is virtually unlimited room for this translation. The vertical travel is imparted to the cartridge by the operator who installs the cartridge onto the motor with the drawer out. Then the operator closes the drawer. In this operating state, the volume of the drive is fully utilized similar to the architecture of the fixed Winchester disk drive. The advantage over other removable cartridge drives is more volume for disks and heads, and therefore, more data capacity.

The key to gaining the packaging advantage of the fixed Winchester disk drive is to share the vertical space of the motor and disks.

In accordance with the invention, the actuator that controls the heads is mounted on the drawer to eliminate potential referencing problems between the motor and actuator.

In accordance with another aspect of the invention, the cartridge has a shutter which encloses the magnetic disks to shield them from contamination. The shutter is opened to permit access to the cartridge when the drawer is closed.

In accordance with another aspect of the invention, a lock for the shutter ensures that the cartridge shutter is in the closed and locked position when the drawer is open. As the drawer is closed, an unlocking mechanism is actuated and thereafter the shutter is engaged to move it to the open position.

The foregoing and other objects, features and advantages of the invention will be better understood from the following more detailed description and appended claims.

SHORT DESCRIPTION OF THE DRAWINGS

DESCRIPTION OF THE PREFERRED EMBODIMENT

Figure 1:
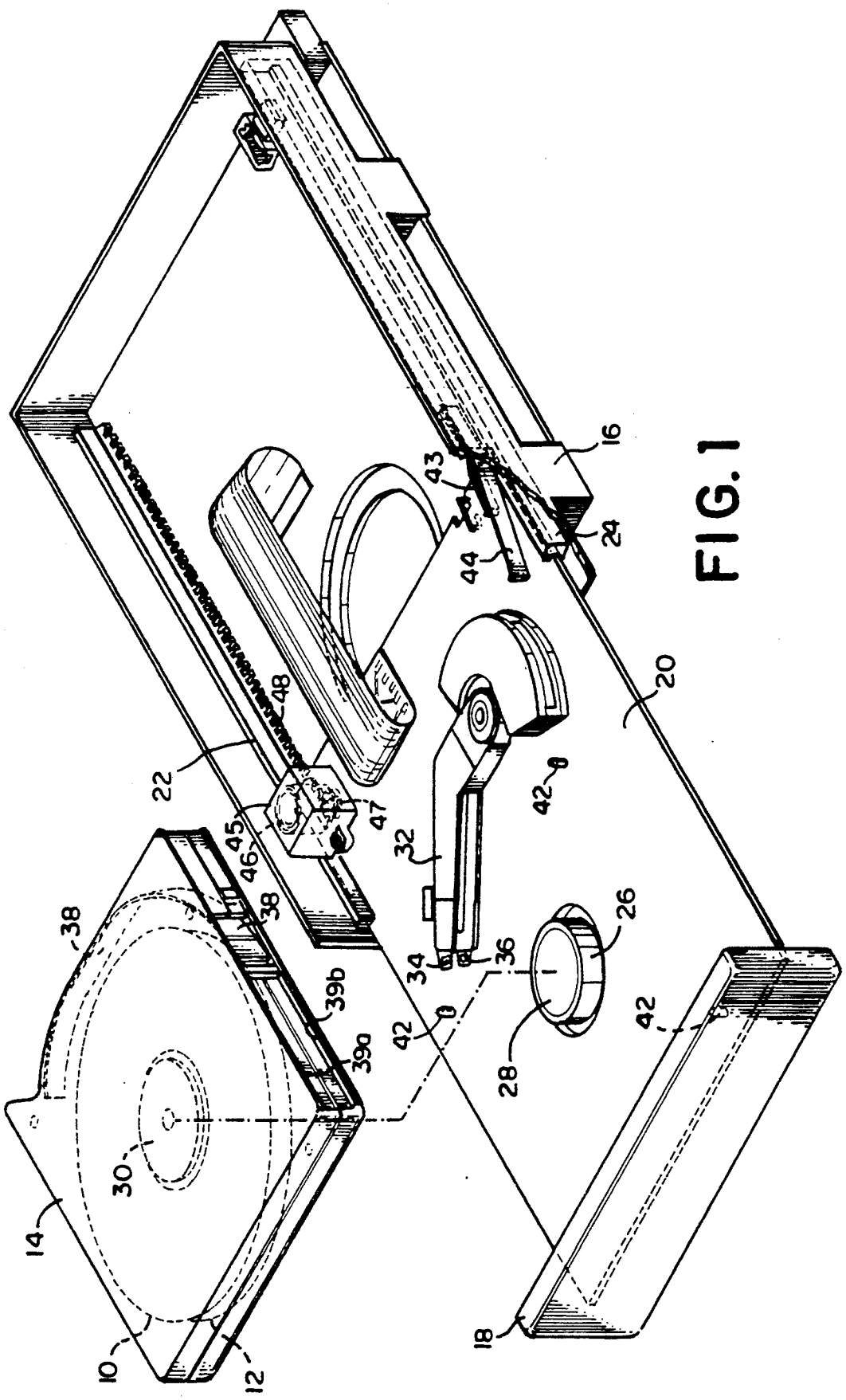
FIG. 1 shows a perspective view of the disk drive with the drawer open.

The figures show a disk drive for writing and reading magnetically recorded data on storage disks 10 and 12 enclosed in a cartridge having a shell 14 with a generally rectangular shape. The disk drive is contained in a chassis 16 having a drawer 18 slidably mounted therein. Drawer 18 has a drawer plate 20 which is guided by the drawer plate guides 22 and 24. The drawer slides in the guides to move between an open position, shown in FIGS. 1 and 3, and a closed position which is shown in FIG. 4. A motor 26 is mounted on the drawer plate 20. Motor 26 has a magnet 28 for coupling the motor to the hub and driving the hub 30 on which the disks 10 and 12 are mounted.

Figure 2:
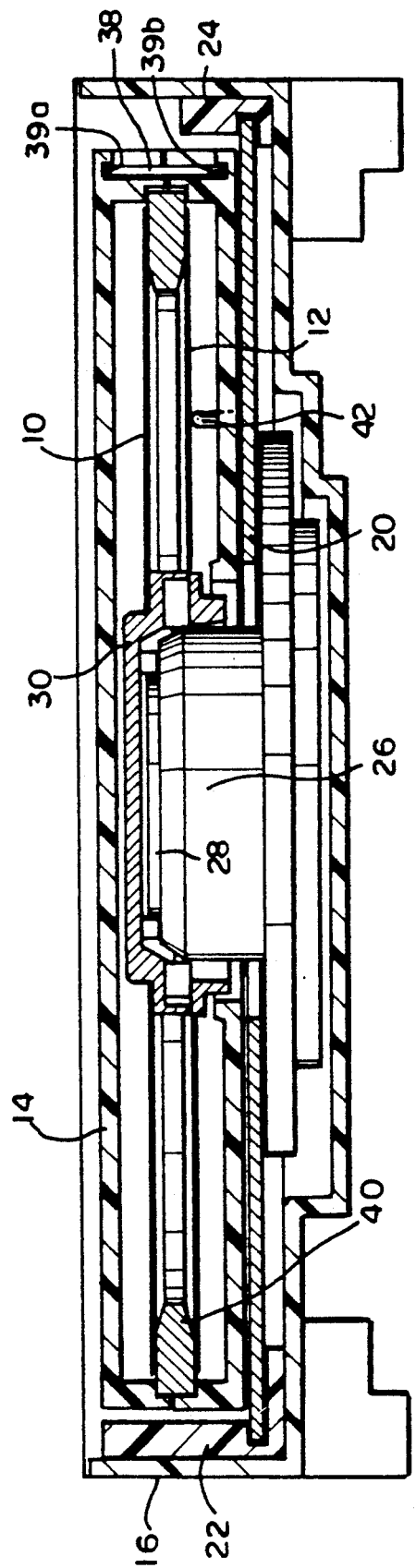
FIG. 2 is a cross-section through the cartridge and drawer.
Figure 3:
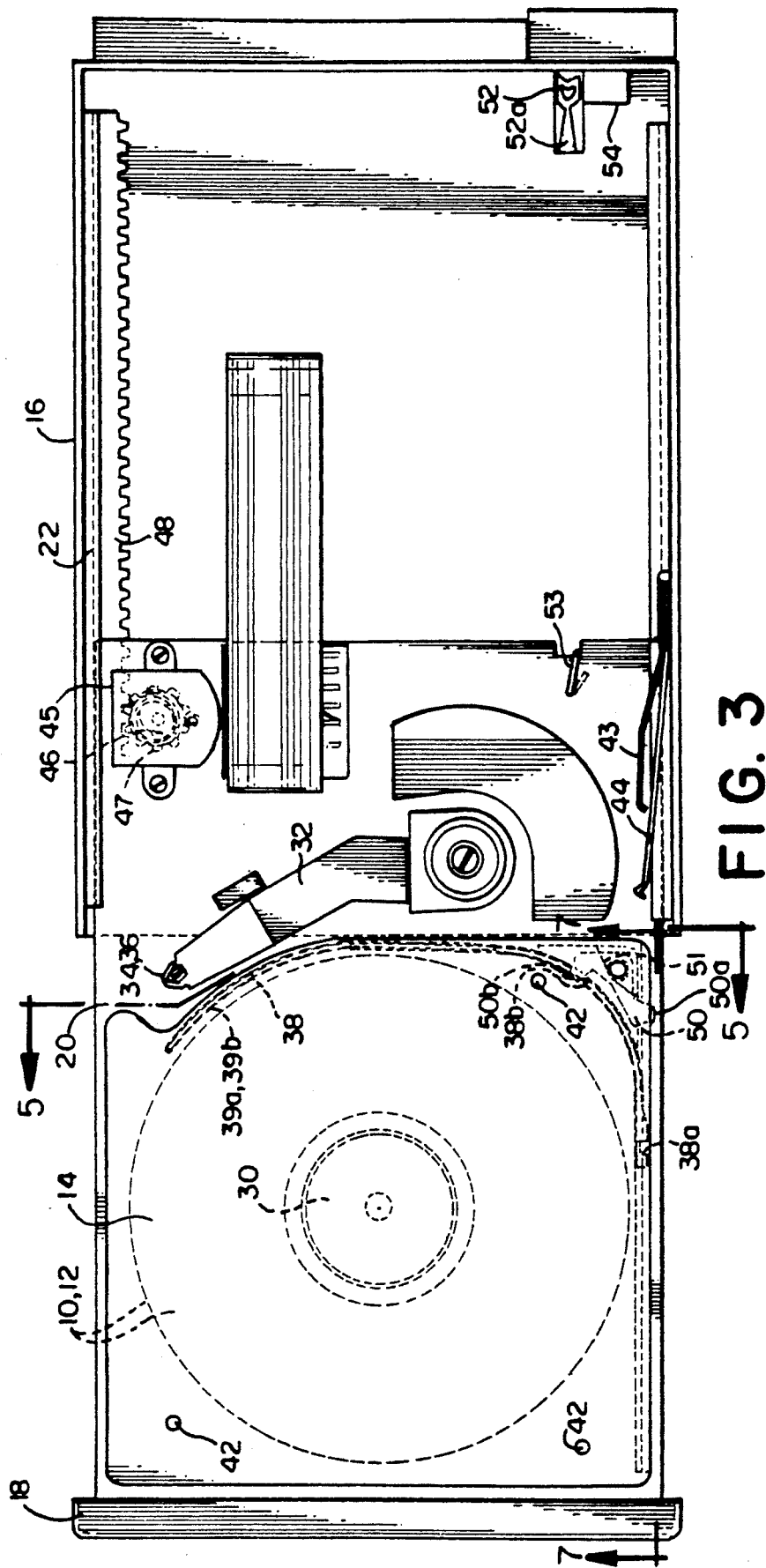
FIG. 3 is a top plan view with the drawer open and the cartridge shutter in the closed position.
Figure 4:
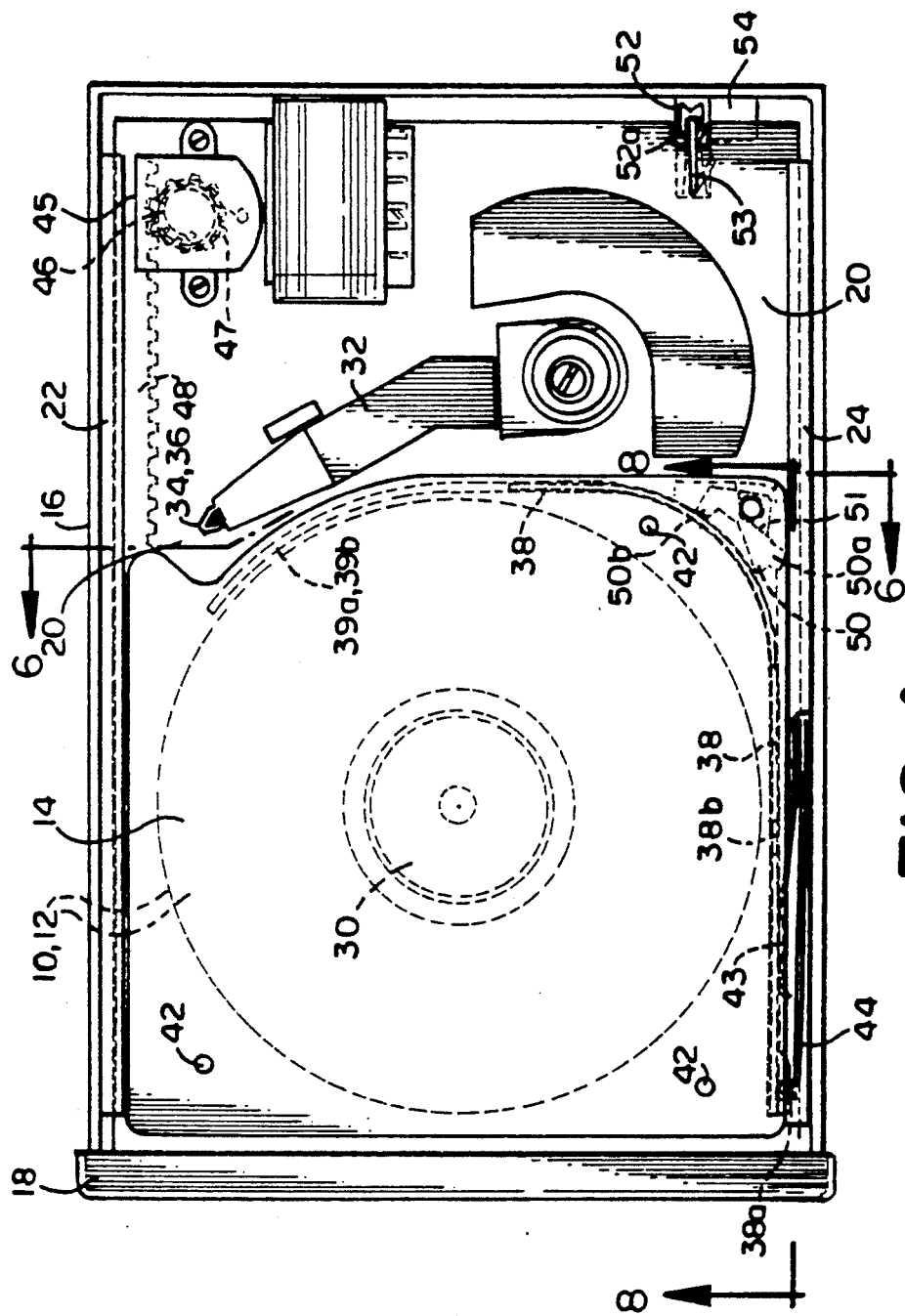
FIG. 4 is a top plan view with the drawer closed and the cartridge shutter in the open position.
Figure 5:
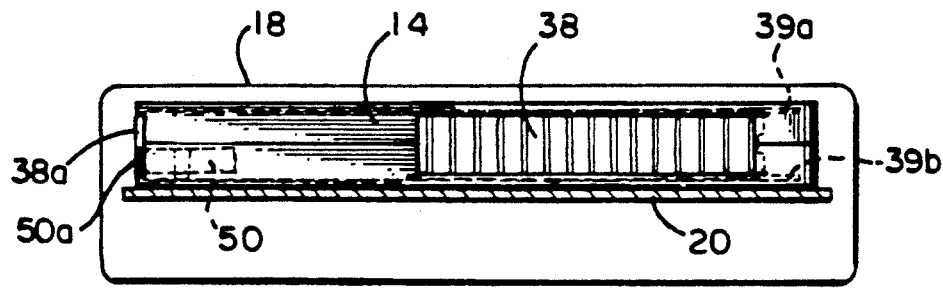
FIG. 5 is a section on the line 5—5 of FIG. 3.
Figure 6:
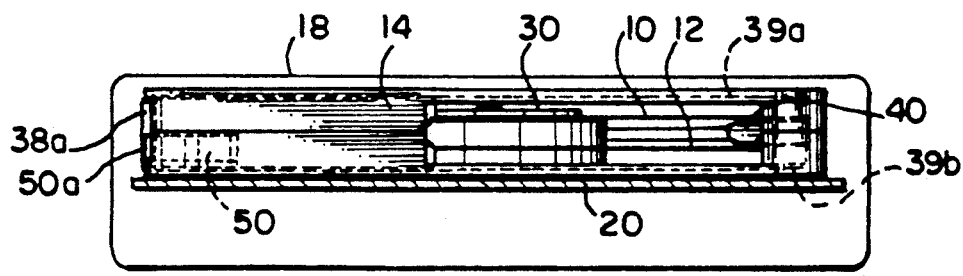
FIG. 6 is a section on the line 6—6 of FIG. 4.
Figure 7:
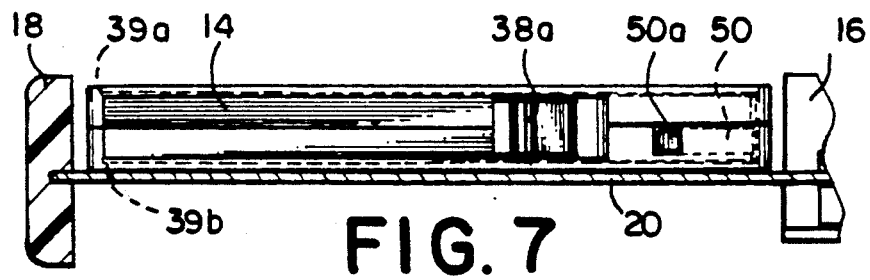
FIG. 7 is a section on the line 7—7 of FIG. 3.
Figure 8:
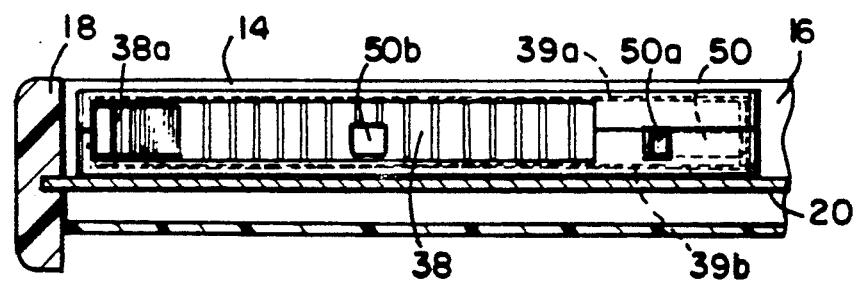
FIG. 8 is a section on the line 8—8 of FIG. 4.

When the drawer is in the open position, as shown in FIG. 1 and 3, the cartridge can be placed onto the drawer plate 20 so that the motor 26 extends into the cartridge and engages the hub 30. The Bernoulli plate 40 (FIG. 2) is contained in the cartridge shell 14. Bernoulli plate 40 rests on three reference pins 42. The Bernoulli plate is disposed between disks 10 and 12. Bernoulli plate 40 stabilizes the disks as they rotate. The reference pins 42 are strategically placed on the drawer plate 20 to provide a reference for the cartridge shell, Bernoulli plate 40 and disks 10 and 12. The reference is established with respect to the motor 26 and hence, with respect to actuator 32. Actuator 32 is also mounted on the drawer plate 20. Read/write heads 34 and 36 are moved by the actuator into read/write relationship with disks 10 and 12. The actuator is mounted on the drawer plate 20 to establish a fixed reference between actuator 32 and motor 26.

A shutter 38 is slidably mounted in cartridge shell 14. The shutter travels in grooves 39a, 39b (FIG. 2) in the cartridge shell 14. The shutter 38 is moved to an open position (FIG. 4) to provide access for the actuator 32 to move read/write heads 34 and 36 into read/write relationship with the disks when the drawer is closed.

Shutter 38 slides in grooves 39a and 39b in the cartridge top and bottom and moves along one side of the cartridge. When the shutter 38 is open, the actuator 32 can move the heads 34 and 36 into engagement with the disks 10 and 12. As the drawer is moved to the open position, the shutter is closed, as shown in FIG. 3, to protect the disks against contamination.

FIGS. 3 and 4 show the means for opening and closing cartridge shutter 38 and the lock 50 for locking the shutter in the closed position when the drawer is open. When the drawer is open, a nub 50b of lock 50 protrudes through hole 38b in the shutter 38. This locks the shutter in the closed position. As the drawer is closed, leaf spring 43 engages nub 50a to rotate lock 50 about its pivot. This lifts the nub 50b out of the hole 38b to unlock the shutter. Leaf spring 44 engages the notch 38a to move the shutter to the open position as the drawer is further closed. When the drawer reaches the position shown in FIG. 4, the shutter is completely open, allowing access by the actuator arm 32.

A dashpot 45 controls drawer opening speed. A power spring 46 within the dashpot housing opens the drawer by rotating the pinion 47 which engages the stationery rack 48. When the drawer is fully closed, a spring 53 rides in the slot 52a and engages the lock 52. A stop 54 limits travel of the drawer.

While a particular embodiment of the invention has been shown and described, various modifications are within the true spirit and scope of the invention. For example, the advantages of the present invention apply to removable "Winchester" disk drives as Well as the described Bernoulli disk drive. The appended claims are, therefore, intended to cover all such modifications.

What is claimed is:

1. A disk drive for writing and reading data to and from a magnetic storage disk contained in a cartridge which has a recessed hub for rotating said disk in said cartridge, said disk drive having a cross-section which defines the envelope of said drive, said drive comprising:

a chassis within said envelope of said drive;
   a drawer slidably mounted in said chassis so that it is movable between a closed position in which said drawer is confined within said envelope and an open position outside said envelope in which said drawer has no vertical obstruction;
   a motor for driving said hub, said motor being mounted in said drawer;
   the arrangement being such that when said drawer is in the open position, the vertical space required for a cartridge to be placed on said drawer with said motor extending into said cartridge to engage said recessed hub is outside said envelope, said cartridge and said motor sharing common vertical space within said envelope when said drawer is in the closed position, whereby the height of said drive is minimized.

2. The disk drive recited in claim 1 further comprising:

read/write transducer means;
   an actuator for moving said transducer means into read/write relationship with said disk;
   said actuator being mounted on said drawer to establish a fixed reference between said actuator and said motor.

3. The disk drive recited in claim 2 wherein said cartridge has a shell enclosing said disk;

a shutter mounted in said shell, said shutter being movable to an open position in which said disk can be accessed by said actuator and to a closed position in which said cartridge is protected; and
   means on said chassis for opening said shutter when said drawer is closed and for closing said shutter when said drawer is opened.

4. The disk drive recited in claim 3 further comprising:

a lock for locking said shutter in the closed position when said drawer is open.

5. The disk drive recited in claim 4 wherein said lock is pivoted and has a first nub which engages a hole in said shutter to lock it and a second nub on the opposite side of said pivot; and a first protrusion mounted in said chasiss, said protrusion engaging the second nub of said lock to pivot said lock, thereby moving said first nub into and out of engagement with said hole in said shutter to lock and unlock said shutter.

6. The disk drive recited in claim 5 wherein said first protrusion is a leaf spring which engages the second nub on said lock.

7. The disk drive recited in claim 4 further comprising:

a second protrusion mounted in said chassis, said second protrusion engaging said shutter to open it as said drawer is closed and to close said shutter as said drawer is opened.

8. The disk drive recited in claim 7 wherein said second protrusion is a leaf spring which engages a notch in said shutter to open and close said shutter.

9. The disk drive recited in claim 3 wherein said cartridge shell is generally rectangular in shape with an opening in one edge thereof, said shutter being slidable in grooves disposed along the sides of said opening.

10. The disk drive recited in claim 1 further comprising:

two storage disks contained in said cartridge;
a Bernoulli plate mounted in said cartridge, said Bernoulli plate being positioned between said two disks 11. The disk drive recited in claim 10 further comprising:

reference pins on said drawer, said Bernoulli plate engaging said reference pins to establish a reference between said Bernoulli plate and said motor.

12. The disk drive recited in claim 1 wherein said storage disk has a magnetic storage medium thereon.

* * * * *